June 17, 1924.
J. G. COLLISON ET AL
FLUID GAUGE
Filed May 13 1920
1,497,771
4 Sheets-Sheet 1
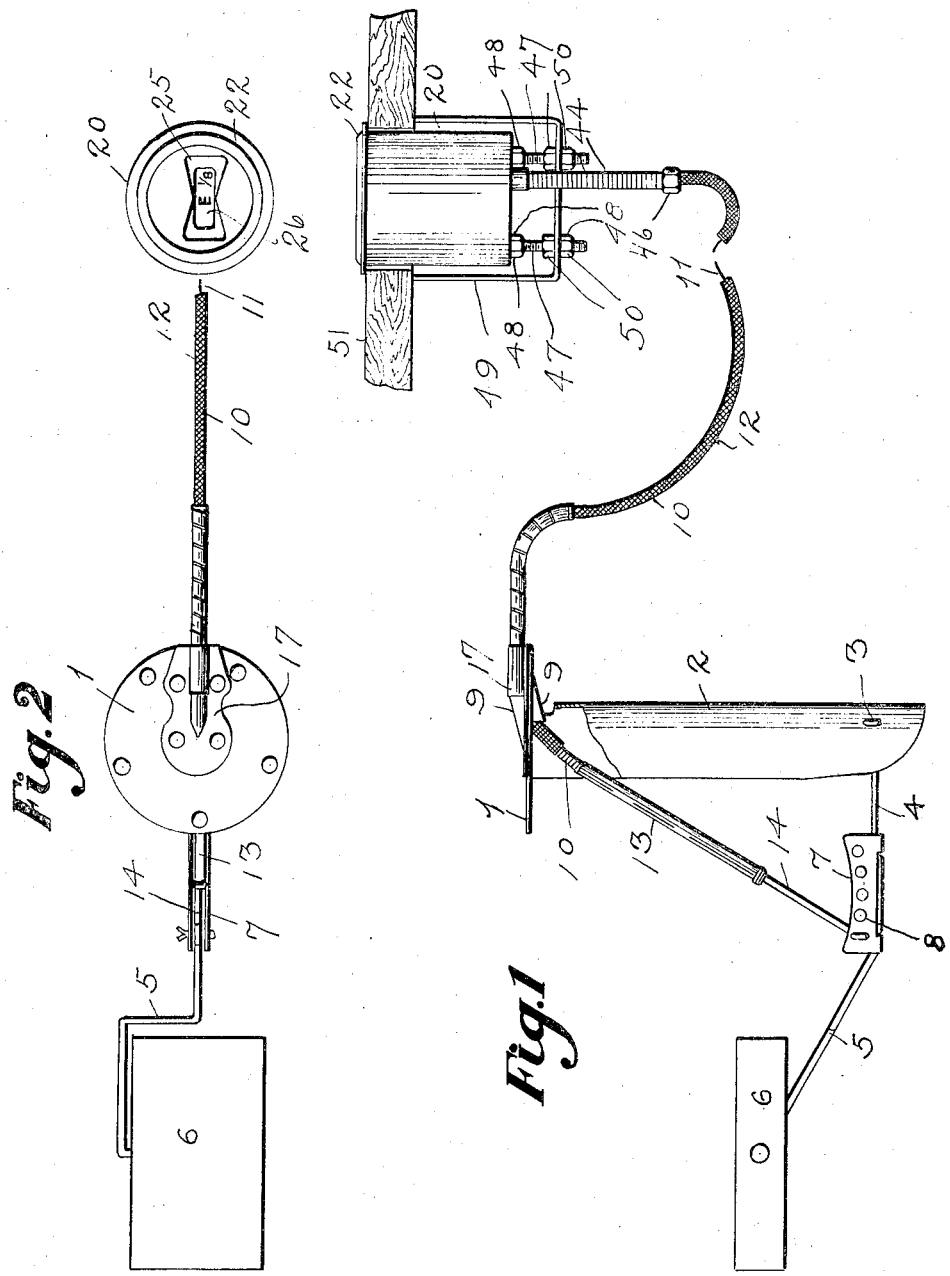
INVENTOR.
HARRY M. FILBERT.
WALTER FRANK.
BY JOHN G. COLLISON.
ATTORNEYS.

June 17, 1924.
J. G. COLLISON ET AL
1,497,771
FLUID GAUGE
Filed May 13, 1920    4 Sheets-Sheet 2
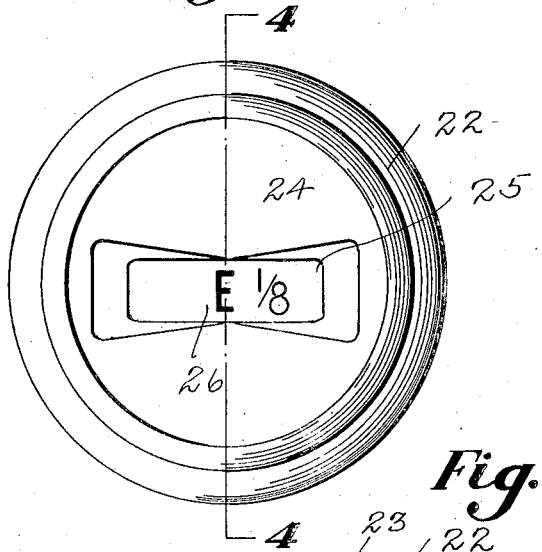
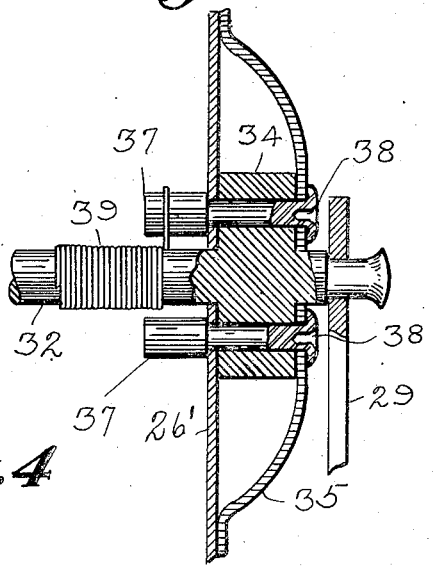
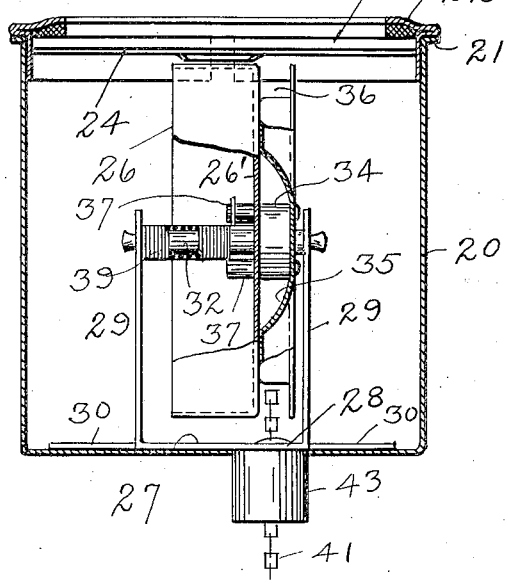
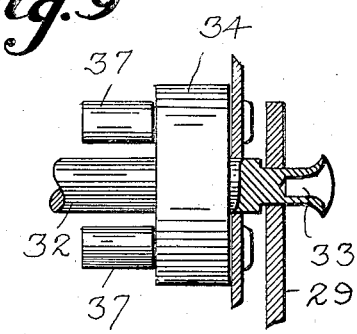
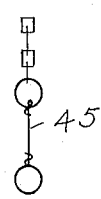
INVENTOR.
HARRY M. FILBERT.
WALTER FRANK.
BY JOHN G. COLLISON.
ATTORNEYS.

June 17, 1924.
J. G. COLLISON ET AL
1,497,771
FLUID GAUGE
Filed May 13, 1920  4 Sheets-Sheet 3
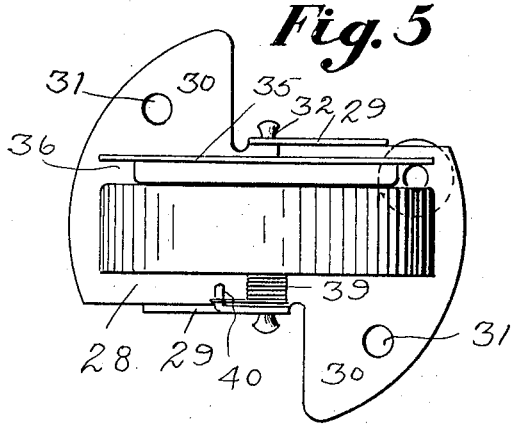
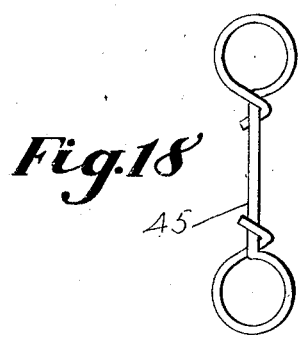
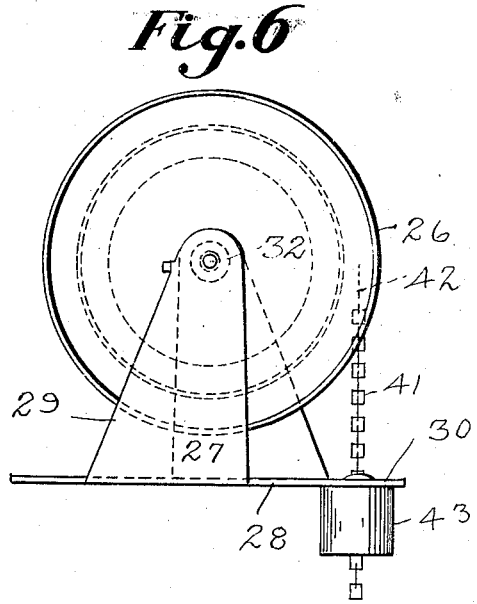
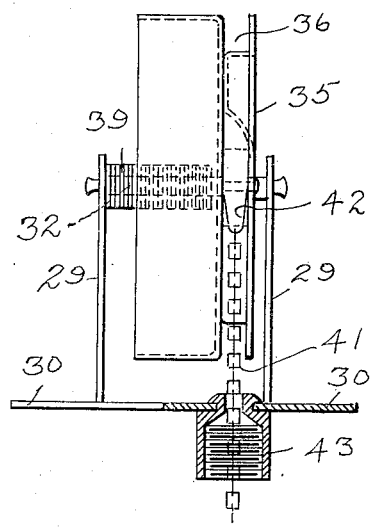
INVENTOR.
HARRY M. FILBERT.
WALTER FRANK.
BY JOHN G. COLLISON.
F. L. Walker
ATTORNEYS.

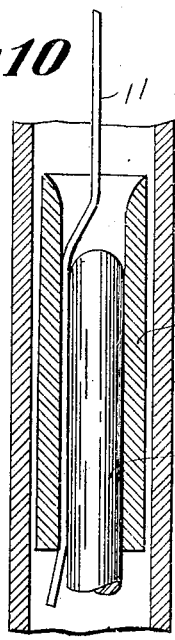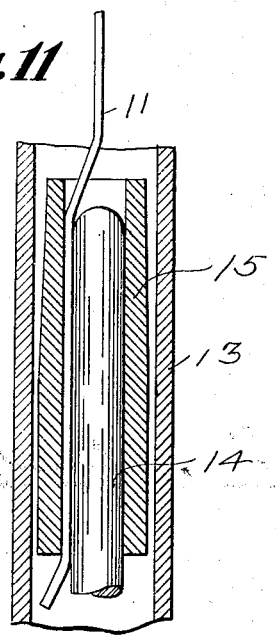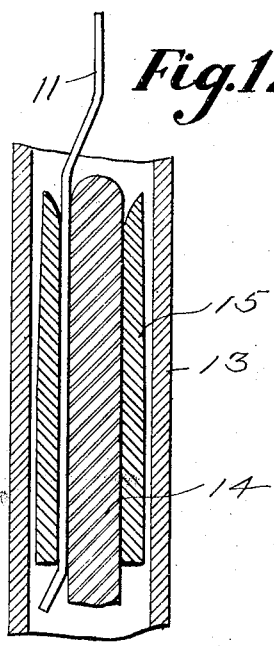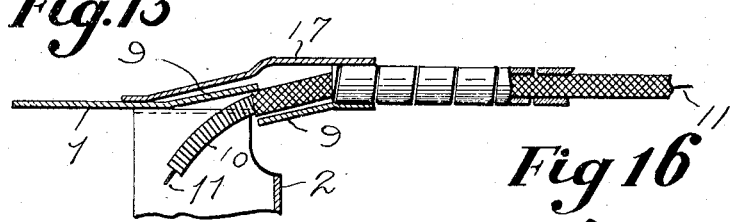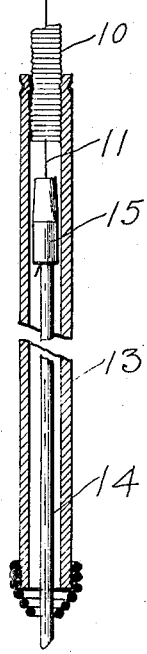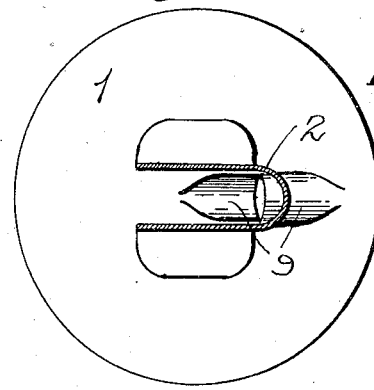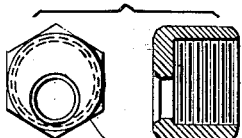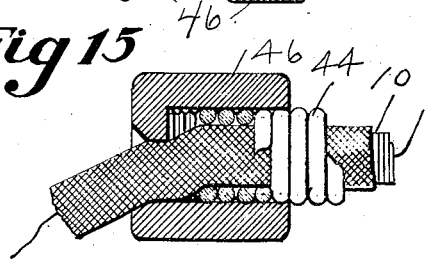

Patented June 17, 1924.

1,497,771

UNITED STATES PATENT OFFICE.

JOHN G. COLLISON, OF DAYTON, WALTER FRANK, OF MIAMISBURG, AND HARRY M. FILBERT, OF DAYTON, OHIO, ASSIGNORS TO THE STEMCO ENGINEERING COMPANY, OF DAYTON, OHIO, A CORPORATION OF OHIO.

FLUID GAUGE.

Application filed May 13, 1920. Serial No. 381,168.

*To all whom it may concern:*

Be it known that JOHN G. COLLISON, WALTER FRANK, and HARRY M. FILBERT, all citizens of the United States, residing, respectively, at Dayton, county of Montgomery, State of Ohio, Miamisburg, county of Montgomery, State of Ohio, and Dayton, county of Montgomery, State of Ohio, have invented certain new and useful Improvements in Fluid Gauges, of which the following is a specification.

This invention relates to measuring instruments, and more particularly to fluid gauges of the float operated type having distance indicating means by which variations of fluid level within a tank or container may be indicated at a distant point in units of quantity or proportional parts. The invention is especially applicable to motor vehicles for indicating upon the dash or cowl board of the vehicle or elsewhere within the normal range of view of the driver, the quantity or proportion of fuel remaining in the supply tank or reservoir which may be located at rear of the vehicle or other convenient position beyond the range of vision of the driver or operator. However, the invention is not limited to such application alone, but may be utilized in stationary installations for measuring and indicating the quantity of contents of tanks for various purposes, or may be utilized as an ullage device for measuring the wantage or deficiency of casks or other containers, and for calibrating receptacles.

The object of the invention is to simplify the structure as well as the means and mode of operation of such devices whereby they will not only be cheapened in construction, but will be more efficient in use, positive in operation, automatic in action, sensitive to fluctuations of fluid level, and unlikely to get out of repair.

While fluid gauges wherein the rise and fall of a float within a tank is automatically indicated at a distant point by fluctuations of an indicator actuated by a reciprocatory movement of an intermediate flexible transmission member acting thru a curvilinear path of travel under the influence of the float are known in this art and now in use, the present invention embodies this known principle of operation in an improved form of indicating gauge having details of mechanical construction capable of commercial standardized production in which the deficiencies and objectionable features of prior devices of this character have been eliminated or overcome.

A further object of the invention is to increase the durability of such gauges whereby they are enabled to withstand the vibrations and strains incident to use upon a motor vehicle, and to decrease the cost of manufacture by enabling the use of interchangeable parts and standardization of production.

A further object of the present invention is to provide an improved form of drum indicator for such gauges, and mounting therefor, and means for interconnecting the drum and control element in such manner as to avoid accidental disarrangement or disconnection of the parts.

A further object is to provide an improved actuating element and guide means for the motion transmitting devices, together with protective means therefor to prevent accidental breakage.

With the above primary and other incidental objects in view as will more fully appear in the specification, the invention consists of the features of construction, the parts and combinations thereof, and the mode of operation, or their equivalents as hereinafter described and set forth in the claims.

In the preferred form of embodiment of the invention, as disclosed in the accompanying drawings, Fig. 1 is a side elevation of the assembled indicating gauge forming the subject matter hereof. Fig. 2 is a top plan view thereof. Fig. 3 is a front elevation or face view of the indicator head. Fig. 4 is a sectional view of the indicator head upon line 4—4 of Fig. 3. Fig. 5 is a top plan view of the oscillatory indicating drum, and its mounting removed from the indicator housing. Fig. 6 is a side elevation, of the drum and its mounting, while Fig. 7 is an elevation thereof partly in section, viewed from the right of Fig. 6. Fig. 8 is an enlarged detail view of the oscillatory drum mounting. Fig. 9 is a detail view of a modification, of the enlarged end of the drum shaft. Figs. 10, 11 and 12 are detail sectional views illustrating different modes of attaching the flexible reciprocatory motion transmitting member with the initial guide rod. Fig. 13 is a detail sectional view of the protective sleeve for the transmission wire conduit. Fig. 14 is a detail sectional view of the inflexible guide terminal for the reciprocatory transmitting elements. Fig. 15 is a view partially in section showing the means of locking the sleeve connected to the indicator to the guide conduit for the transmission wire. Fig. 16 is an end elevation and section, respectively, of the lock nut illustrated in Fig. 15. Fig. 17 is a plan view of the closure plate for the tank, partially in section.

Like parts are indicated by similar characters of reference throughout the several views.

The tank unit or control element of the device comprises a closure plate or head 1, engageable with the side walls of the tank upon which is fixedly supported a dependent hanger 2. This hanger 2 is preferably, though not necessarily formed from sheet metal bent upon itself to parallelism, the wings of which are separated somewhat one from the other to form a slotted or recessed support. Pivoted at 3 upon a transverse pin extending thru the side walls or wings of the recessed hanger 2, is a float arm 4 which for convenience and economy of manufacture is formed from a length of wire turned at one end to form an eye, which engages about the pivotal pin 3, while the free end of the float arm 4 is offset or bent laterally as at 5 to accommodate a float 6. The float 6 may be merely a block of cork, or other like material, but is preferably a hollow sheet metal body, which possesses the necessary buoyancy and which possesses the advantage of being uniform in its controlling action, whereas different bodies of cork vary and differ in density or specific gravity and hence in their buoyancy. The float 6 is pivotally connected to the free end of the float arm 4 on a transverse axis medially disposed, both as to vertical, and longitudinal dimension, while the main portion of the float arm 4 extends substantially in alinement with the center line of the float. The pivotal connection 3 of the float arm is at a point substantially mid-height in relation with the range of movement of the float, whereby the float 6 moves to a height above the level of the pivotal connection when the tank is full substantially equal to the depression of the float below such pivotal connection when the tank is empty. By this relation of the pivotal point with the range of movement the most effective leverage action of the float is utilized, and any differential due to the angularity of the float arm is reduced to minimum. Secured upon the float arm 4 at a medial point is a connection member 7, having therein a series of holes 8, in any one of which the movement transmission member may be connected to afford a greater or less leverage and to impart thereto greater or less degree of movement in proportion to the movement of the float, whereby the device may be more readily accommodated to tanks or reservoirs of different shape and capacity. This attachment clip may be secured in any suitable manner, but for convenience of manufacture is preferably formed from sheet metal bent upon itself to parallelism about the float arm 4 which is clenched within the clip. The mounting of the oscillatory float arm 4 within the recess of the hanger 2 gives definition to the vertical movement of the float arm which is confined to a single plane of oscillation by the parallel side walls or wings of the hanger, 2.

The movement of the float arm 4 due to fluctuations of the fluid level within the tank or reservoir is transmitted to the distant indicator by means of a flexible reciprocatory wire actuated to and fro thru a tubular conduit in unison with the oscillations of the float. The head or closure plate 1 is perforated at a point coincident with the recess intermediate the side wings or walls of the hanger 2 for the passage of this reciprocatory actuating wire and its guide tube. The opposite edges of the perforation in the head 1 are deflected in opposite direction, that is to say upward and downward as shown at 9 in Fig. 13, whereby there is formed a diagonal or inclined passage, thru the head or plate 1 to receive the guide tube for the transmission wire. The guide tube 10 thru which the motion transmission wire 11 is reciprocated by the rise and fall of the float arm 4 is sufficiently flexible to permit it to be bent into various tortuous shapes necessary to guide the transmission wires 11 from the tank or reservoir to the distantly located indicator. This guide tube 10 may be of any suitable construction, but for convenience and economy of manufacture it preferably comprises a coiled wire formed into helical formation of such size as to permit the free reciprocatory movement of the transmission wire 11, therethru without permitting any material lateral deflection or buckling of said wire. The exterior of the helical wire guide tube or conduit 10 is covered with a fabric envelope or braiding 12, preferably saturated with water-proofing material. This braiding or fabric covering of the guide tube or conduit 10 is stripped from the end of the conduit at its point of entrance thru the closure plate or head 1 into the recess of the hanger 2, in order to afford a greater freedom of movement or flexibility of the guide tube at this point. The extremity of the flexible guide tube or conduit 10 projecting thru the closure plate or head 1 is connected with a stiff or inflexible tubular extension 13. The short length of guide tube or conduit 10 projecting thru the head or plate 1 affords a flexible or yielding connection to accommodate an oscillatory movement of the stiff or inflexible tubular extension 13 in unison with the oscillation of the arm 4. The connection of the guide conduit terminal and the tubular extension 13 may be by welding, brazing, soldering or other connection, but since the guide conduit or tube 10 is preferably formed from a helically disposed wire, the convolutions of this helical conduit are utilized as screw threads to engage interior screw threads within the upper end of the rigid tubular extension 13.

Pivotally connected in one of the holes 8 in the attachment clip 7 according to the shape or capacity of the tank or reservoir is a comparatively stiff reciprocatory guide rod 14, which extends within the rigid tubular extension 13. If the flexible reciprocatory wire 11 was connected directly to the float arm 4 more or less of the flexible wire would be exposed by the downward oscillation of the float arm. Upon the return upward movement of the arm, exerting a compression movement upon the reciprocatory transmission wire, such exposed portion of the transmission wire would tend to buckle or be deflected laterally and hence fail to operate the distantly located indicator or in any event interfere with its accuracy. This difficulty is overcome by employing the stiff wire or guide rod 14 as the initial section of the reciprocatory motion transmitting member. In some instances, the flexible guide tube or conductor 10 has been extended a considerable distance below the head or closure plate 1 and such initial guide rod or wire 14 made to reciprocate within the flexible extension. Difficulty has been experienced, however, in such constructions by the tendency of the flexible extension to bend or yield within the tank immediately above the end of the rigid or stiff initial rod and so interfere with the freedom of movement of the motion transmitting member. To overcome this difficulty the rigid tubular extension 13 has been provided for the guidance of the initial stiff wire or guide rod 14 which does not extend therebeyond at its extreme limit of movement. The guide tube 13 is of somewhat greater diameter than the guide rod 14 to accommodate a coupling sleeve 15 secured to the upper end of the guide rod 14 within the tube 13, by which the flexible motion transmission wire 11 is secured to the initial stiff guide rod 14. The adjacent ends of the transmission wire 11 and guide rod 14 are arranged in overlapping relation and enclosed within the coupling sleeve 15. In those instances in which the guide rod 14 has been extended beyond the coupling sleeve 15 and the latter formed with a comparatively square or close fitting end, difficulty has been experienced thru the crimping or breaking of the pliant transmission wire 11 at this point. This difficulty in the present construction is overcome by forming the coupling sleeve 15 with a flaring or bell mouthed extremity projected somewhat beyond the end of the guide rod 14, which is also preferably rounded as shown in Fig. 10. By this construction abrupt bends in the pliant transmission wire 11 are prevented at the point of connection of said wire with the guide rod, and consequent breakage is eliminated. In lieu of the construction shown in Fig. 10 in which the flaring or bell mouthed extremity of the sleeve 13 projects beyond the end of the guide rod, the sleeve may be so projected without being flared or bell mouthed as shown in Fig. 11, in which the end of the coupling sleeve 15 limits the lateral deflection of the transmission wire without being flared, while in Fig. 12 there is shown a further modification in which the sleeve 15 is flared or bell mouthed at its extremity, but does not project beyond the end of the guide rod 14, such flaring of the sleeve permitting a limited deflection of the wire without permitting an abrupt bend or kink being formed therein. Since the guide tube extension 13 is of greater diameter than the rod 14 to accommodate the coupling sleeve 15, means is provided for guiding the rod centrally within said tube at the lower end thereof. To this end the tube 13 may be partially closed by spinning or swedging to afford a reduced orifice thru which the guide rods 14 may reciprocate, but on account of difficulties of assembling such a construction, there is preferably provided a detachable cap having an opening therein agreeing with the diameter of the guide rod 14, and engageable upon the free lower end of the tube 13. A simple and convenient form of guide cap has been shown in Fig. 14 comprising a tapered helical spring, the larger convolutions of which are utilized as screw threads engaging threads formed upon the lower free end of the guide tube 13. The smaller convolutions of the tapered helical spring forming this guide tube cap hugs the guide rod 14 loosely centering it in relation with the tube 13.

The insertion of the tank unit heretofore described thru a suitable opening provided in the top of the gasolene tank or reservoir of a motor vehicle leaves a portion of the tubular guide conduit for the transmission wire 11 exposed where it leads from the head or closure plate 1 toward the front of the vehicle. This exposed portion of the tubular guide conduit is subject to more or less vibration, and to accidental stresses and strains particularly in the washing of the vehicle, which may cause abrupt bends in the conduit resulting in breakage of the wire 11 or kinks being formed therein, and undue resistance to its reciprocatory movement. In order to protect the exposed portions of the tubular conduit, there is provided a protective sleeve 16 (shown in detail in Fig. 13) which encloses this portion of the guide conduit and is clamped in position by a clamp plate 17, secured to the top of the closure plate or head 1. This protective sleeve 16 may be merely a metallic tube, but is preferably a helical coil of flattened wire as shown in detail in Fig. 13. While a round wire will afford a degree of protection, the flattened wire shown in said figure affords somewhat less flexibility yet is not rigid. This type of helical flattened wire coil is preferred since it resists the minor vibrations and bending stresses, but yields somewhat to the more forceful movements of the exposed portion of the conduit, without, however, permitting the conduit to assume any abrupt bend or strained positions. This protective sleeve 16 may be of any length in accordance with the extent of exposure of the guide tube 10. The cap plate 17 serves to clamp and hold the guide tube 10 fixed against longitudinal movement in relation with the head or closure plate 1.

By the construction heretofore described, the vertical oscillations of the float arm 4 under the influence of the float 6 actuates the transmission wire 11 thru alternate compression and tension movements within the tubular guide conduit 10 thru the medium of the initial stiff guide wire section 14 which is directly connected to the float arm 4 for positive movement in alternate direction. This movement is transmitted to the distant point, usually the dash or cowl board of the vehicle, through such tortuous path as may be necessary to avoid intermediate obstructions to which tortuous path the flexible tubular guide conduit 10 and transmission wire 11 readily accommodate themselves. The actuating gauge member heretofore described may be utilized to operate various forms of indicator, however, there has been shown in the drawings, a preferred form of oscillatory drum indicator. The operating parts of the indicator are contained within a cylindrical cup-shaped housing 20 having about its mouth a peripheral flange 21, upon which is seated a closure head 22, having therein a glass or transparent face 23, overlying a mask 24 thru the observation space 25 of which is visible the oscillatory indicator drum within. The indicator drum 26 is mounted for oscillatory movement in a plane parallel with the axis of the housing 20 whereby the periphery of the drum 26 is visible thru the observation space 25 of the mask. The indicating drum 26 is preferably formed from sheet metal or other sheet material of low specific gravity, whereby the drum will possess but little inertia to be overcome, and moreover the movement of the drum under the influence of the float, will develop but little momentum thereby obviating any tendency for overthrowing or back lash. To this end a quite thin sheet aluminum has been found desirable and suitable for the purpose, although other material may be found equally efficient. Carried upon the periphery of the drum 26 and exposed thru the observation space 25 of the mask 24, is a series of graduations or characters indicative of quantity or proportionate amounts of the contents of the tank or reservoir. That is to say, these characters appearing thru the observation orifice 25 may be in units of gallons or fractional parts thereof, or they may be in units of the capacity of the tank or reservoir, and indicate the contents as fractional parts of such capacity as one eighth, one quarter, one half, etc. The drum 26 is mounted for free oscillatory movement in a mounting or support 27, preferably stamped from sheet metal and comprising a base portion 28, from which projects two upturned spaced wings 29 forming struts or standards, and two laterally disposed arcuate wings 30, which comprise extensions of the base 28 agreeing substantially in outline with the interior of the circular housing 24. The struts or standards 29 being formed integral with the base portion 28, from the opposite sides of which they project, afford a simple and economical method of producing this mounting, while the arcuate extension 30 projects sufficiently beyond the indicator part to afford easily access for attachment bolts introduced thru the openings 31, in said wings or extensions. The drum 26 is fixedly secured to an oscillatory supporting shaft 32 journaled in the upturned standards or struts 29 of the mounting.

The ends of the supporting shaft 32 are reduced in diameter and projected thru registering openings in the upper ends of the strut or standard, while the ends of this shaft beyond the supporting strut are enlarged to prevent their accidental disengagement. The enlargement of the ends of the bearing shaft 32 is preferably effected by a spinning operation, by which the ends of the shaft are upset or expanded without materially expanding the trunnions of the shaft within their bearing in the standards or struts 29, as would be the case if the ends of the bearing shaft were riveted. The riveting of the exposed or extended ends of the bearing shaft would distort and strain the shaft particularly at its bearing point to such extent as to possibly interfere with the free play of the drum to and fro upon these bearings. By experiment and practical demonstration, it has been found that the enlargement of the shaft end by spinning produces a desirable condition which prevents the accidental disengagement of the shaft from its bearing without in any way causing the same to bind or increasing its frictional resistance. The solid end of the shaft may be readily spun sufficiently to enlarge it as shown in Fig. 8 by a suitably shaped tool. However, in Fig. 9 there is shown a modification of this construction, in which the end of the shaft prior to spinning is first counter-bored, as at 33, this counter-bored extremity being subsequently flared or expanded outward without distorting the trunnion bearing of the shaft. The bearing shaft 32 is formed with an enlarged integral collar 34, adjacent to one end thereof against which the web portion 26' of the drum 26, abuts.

Also mounted upon the shaft 32 and abutting upon the opposite side of the integral collar 34 is a concave disc 35 which encloses the integral head 34 with its marginal portion abutting upon the lateral face of the drum 26. This concave disc 35 is provided with a laterally offset marginal flange forming a rabbet 36. The disc 35 and drum 26 are fixedly connected one to the other for oscillation in unison. This connection may be by soldering, welding, brazing or other suitable mode of attachment. However, there has been shown in the drawing two stud or pins 37 projected thru the web of the drum 26, and the disc 35 and intermediate integral head 34, and secured by riveting or preferably by spinning the protruding ends of the stud or pin. The upset or out-turned ends of these studs or pins 37 are preferably counterbored as shown at 38 in Fig. 8, and such counterbored portion is subsequently flared outwardly and backwardly against the face of the disc 35 by a spinning operation, which not only insures a more uniform and secure connection, but also avoids any strains or stresses, and tendency to buckle the part which might be induced by a riveting operation. These studs or pins 37 not only serve to unite the disc and drum, but also serve as a connection for one end of a helical retracting spring 39, which tends to oscillate the drum in one direction. This spring 39 is coiled about the supporting shaft 32, and its opposite end is engaged with an integral finger or hook 40, formed upon one of the struts or standards 29 of the mounting. The spring 39 is of comparatively light tension, and this tension is adjusted by engaging the end of the spring with one or the other of the pins or studs 37. Thus by releasing the spring from one stud or pin, and engaging it with the other, the spring may be tensioned or relieved thru a half turn.

As before mentioned, the tension of the retracting spring 39 is quite weak, preferably only sufficient to actuate the drum when permitted to do so by the relaxation of compression movement of the transmission wire 11. The spring 39 normally is of insufficient tension to have any appreciable influence upon the movement or retraction of the transmission wire 11. This transmission wire 11 is actuated to and fro thru alternate compression and tension movement solely by the influence of the float. In its tensioning movement or retraction as the float descends, the transmission wire oscillates the indicator drum 26 against the tension of its weak retracting spring 39. However, upon the return or compression stroke, of the transmission wire 11 under the influence of the elevation of the float, its action is merely to release or relax its tension upon the drum, which is thereupon actuated under the influence of the spring 39. To this end there is provided a yielding connection between the transmission wire 11 and the drum 26. This connection may be a yielding or flexible cord or cable, but for durability and ease and economy of assembly, a very fine chain 41 is employed.

The relation of the offset peripheral flange or rabbet 36 of the concave disc 35 with the lateral face of the drum 26 forms adjacent to said drum a peripheral groove or recess in which the flexible yielding connection whether the same be a chain 41 or a cord or cable is reeled or wound by the retractive movement of the drum under the influence of the spring 39. The flexible connection 41 is interconnected with the drum by means of a U-shaped wire 42, with which the end of the flexible connection 41 is engaged, the ends of said U-shaped wire being out-turned and in turn engaged in oppositely disposed holes in the flange of the disc 35 and the web of the drum 26 respectively. The U-shaped wire connector 42 being somewhat resilient and under tension when engaged with the drum or disc tends to automatically maintain its engagement and affords a cheap and simple connection easily assembled. The flexible connection or chain 41 after extending partially about the peripheral groove formed in the drum by the juxtaposition of the disc 35, passes from the indicator housing 20 thru an internally screw threaded boss 43 attached to the base 28 of the mounting 27, and projecting thence thru a suitably located hole in the bottom or head of the cylindrical housing 20. This guide boss 43 is counterbored to provide a reduced orifice for the passage of the flexible or yielding connection and a larger screw threaded orifice for the reception of a guard and adjusting sleeve 44. The counter-bored guide boss 43 is secured to the mounting 27 by riveting the same in a suitable hole provided in the base 28 of said mounting. Heretofore such guide bosses have been secured by screw threading but such connection has been found not only more expensive but less efficient than a riveted connection. Engaged within the guide boss 43, is the sleeve 44 which preferably though not necessarily comprises a helically coiled wire, the terminal convolutions of which are utilized as screw threads for engagement in the internal screw threads of the counter-bored guide boss. The extremity of the tubular guide conduit 10 for the transmission wire 11 extends within the sleeve 44, and is adjustable telescopically therein to afford the proper relative adjustment between the indicator head and the tank unit. Moreover, this relative adjustment is desirable for the purpose of synchronizing the indicator drum with the float. The transmission wire 11 is interconnected with the yielding flexible connection 41 within the sleeve 44, preferably by means of a double eyed link 45. This link 45 is preferably formed from a length of wire, the opposite ends of which are bent to form independent eyes with the extremities of the wire wrapped about the shank of the link intermediate the terminal bends or eyes. The purpose of this type of connection is to prevent the accidental disengagement of the transmission wire 11 and chain 41 or flexible yielding connection, upon the compression or relaxating movement of the wire. By the type of link just described, each of these elements is independently connected to the link in such manner that they cannot become accidentally entangled one with the other, nor released from the link. The indicator head having been adjusted upon the conductor 10 to proper relation with the tank unit, and the indicator drum 26 synchronized with the float, by telescopic adjustment of the tubular guide conductor 10 and sleeve 44 these members are fixedly engaged one with the other, by a compression cap or nut 46. This compression cap 46 is internally screw threaded for engagement with the terminal convolutions of the helical sleeve 44, and has formed eccentrically therein an opening for the passage of the tubular conductor 10. As the compression cap is adjusted upon the sleeve 44, the tubular conductor 10 is deflected laterally against the inner side of the sleeve 44 as shown in the enlarged detail Fig. 15, thereby causing the sleeve 44 and conductor 10 to firmly bind one upon the other, thus interlocking them against relative longitudinal movement. This binding or interlocking of the conduit and sleeve, however, is not sufficient to compress the conduit or in any way interfere with the freedom of movement of the transmission wire 11 therethru.

In mounting the indicator head, a circular opening is provided in the dash or cowl board of the vehicle or other support, for the indicator thru which the housing 20 is inserted until the peripheral flange 21 bears upon the outer face of such support about the opening. Bolts 47, projecting thru the holes 31 in the wings or extensions 30 of the mounting 27, project thru registering openings in the head or bottom of the housing 20, and carry nuts 48 which clamp the mounting 27 securely to the bottom of the housing 20. These bolts 47, projecting rearward beyond the housing 20, extend thru a U-shaped clamp bar 49, adjustably engaged thereon by nuts 50 disposed on opposite sides of said clamp bar. The parallel arms of the U-clamp bar extend on opposite sides of the housing 20 and engage the rear side of the cowl board or support 51. By the adjustment of the nuts 50, the U-clamp bar is made to abut upon the cowl board or support, and the further adjustment of the nut 50 tends to draw the housing 20 of the indicator head thru the openings in the cowl board or support, causing the marginal flange 21 thereof to bear firmly upon such support.

From the above description it will be apparent that there is thus provided a device of the character described possesing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific details shown, but that the means and construction herein disclosed comprise but one of several modes of putting the invention into effect, and the invention is therefore claimed in any of its forms or modifications within the legitimate and valid scope of the appended claims.

Having thus described our invention, we claim:

1. A fluid gauge wherein a distant indicator is controlled by the longitudinal movement of an intermediate flexible control member under the influence of a float, characterized by a reciprocatory rod overlapping a portion of the flexible control member, a sleeve tightly enclosing the overlapping portions of the rod and flexible member for movement in unison one with the other, said sleeve having a flaring mouth permitting a limited degree of deflection of the flexible member adjacent to its point of engagement with the rod to avoid abrupt bends therein, substantially as specified.

2. A fluid gauge wherein a distant indicator is controlled by the longitudinal movement of an intermediate flexible control member under the influence of a float, characterized by a reciprocatory rod overlapping a portion of the flexible control member, a sleeve tightly enclosing the overlapping portions of the rod and flexible member for movement in unison one with the other, the end of said rod being reduced to form in relation with the sleeve, a convergent space within which the rod and flexible member are connected, whereby the degree of deflection permitted the flexible member is decreased as it approaches its connection with said rod to avoid abrupt bends therein.

3. A fluid gauge wherein a distant indicator is controlled by the longitudinal movement of an intermediate flexible control member under the influence of a float, characterized by a reciprocatory rod to which one end of the flexible member is connected, and guard means located adjacent to the juncture of the rod and flexible member and moving therewith for limiting the degree of deflection permitted the flexible member in relation with the rod, to prevent abrupt bends therein adjacent to their juncture.

4. A fluid gauge wherein a distant indicator is controlled by the reciprocatory movement of an intermediate control member under the influence of a float, characterized by a tubular guide for the longitudinally movable control member including two sections one of which telescopes within the other, a cap nut screw threaded upon the section of greater diameter having eccentrically positioned therein a hole thru which the section of smaller diameter extends, the inserted section being pressed against the inner side of the larger section by the adjustment of the cap nut to detachably connect it therewith.

5. A fluid gauge wherein a distant indicator is controlled by the reciprocatory movement of an intermediate control member under the influence of a float, characterized by a tubular guide for the longitudinally movable control member including two sections one of which telescopes within the other and means for pressing one of said sections laterally in eccentric relation with the other section to maintain the interengagement of said members.

6. A fluid gauge wherein a distant indicator is controlled by the reciprocatory movement of an intermediate control member under the influence of a float, characterized by a tubular guide for the longitudinally movable control member including two sections one of which telescopes within the other, a thimble concentrically positioned in relation with one section and eccentrically positioned in relation with the other section and means for adjusting the thimble longitudinally in relation with the said sections to cause them to bind one upon the other.

7. A fluid gauge wherein a distant indicator in controlled by the reciprocatory movement of an intermediate control member under the influence of a float, characterized by a tubular guide for the longitudinally movable control member including two sections one of which telescopes within the other, a cap adjustably mounted upon the section of larger diameter having in the head of such cap an eccentrically positioned hole overlapping the side wall of said larger section and having a diameter substantially equal to that of the smaller section which smaller section projects therethru and into the larger section, the adjustment of said cap being adapted to effect the pressure of said sections one upon the other.

8. A fluid gauge wherein a distant indicator is controlled by the reciprocatory movement of an intermediate control member under the influence of a float, characterized by a tubular guide for the longitudinally movable control member including two sections one of which telescopes within the other, a revolubly adjustable cap mounted eccentrically in relation with one of said sections and concentric in relation with the other section, adapted by its revoluble adjustment to compress one section upon the other.

9. A fluid gauge wherein a distant indicator is controlled by the reciprocatory movement of an intermediate control member under the influence of a float, characterized by a tubular guide for the longitudinally movable control member including two sections one of which telescopes within the other, and adjustable means engaging the respective sections to deflect one section laterally in relation with the other into firm unyielding contact, substantially as specified.

10. A fluid gauge wherein the rise and fall of a float within a tank is indicated at a distant point by the fluctuations of an indicator controlled by the reciprocatory movement of an intermediate flexible member acting thru a curvilinear path of travel under the influence of the float, characterized by an oscillatory indicator drum, a disc having a peripheral flange formed thereon fixedly secured to the side of the drum and forming therewith a peripheral groove for the engagement of said flexible member.

11. A fluid gauge wherein the rise and fall of a float within a tank is indicated at a distant point by the fluctuations of an indicator controlled by the reciprocatory movement of an intermediate flexible member acting thru a curvilinear path of travel under the influence of the float, characterized by two oppositely arranged oscillatory flanged members secured one to the other actuated in unison with the to and fro movement of the flexible member, the flange of one member having thereon an indicating demarcation, the flange of the other member forming with the first mentioned member a peripheral groove for the engagement of the flexible member.

12. A fluid gauge wherein the rise and fall of a float within a tank is indicated at a distant point by the fluctuations of an indicator controlled by the reciprocatory movement of an intermediate flexible member acting thru a curvilinear path of travel under the influence of the float, characterized by an oscillatory indicator drum actuated in unison with the to and fro movement of the flexible member, a concave disc secured to one side of said drum whereby the peripheries of said drum and disc are separated to form an intermediate peripheral groove to receive said flexible member.

13. A fluid gauge wherein the rise and fall of a float within a tank is indicated at a distant point by the fluctuations of an indicator controlled by the reciprocatory movement of an intermediate flexible member acting thru a curvilinear path of travel under the influence of the float characterized by an oscillatory indicator drum actuated in unison with the to and fro movement of the flexible member, and a concave disc, said disc having its concave central portion facing the drum with the periphery of the concave portion resting against the side of said drum, a supporting shaft for the drum and disc, and a collar on said shaft between said drum and the central portion of said disc.

14. In a fluid gauge wherein the rise and fall of a float in a tank is indicated at a distant point by the fluctuations of an indicator controlled by the reciprocatory movement of an intermediate flexible member acting thru a curvilinear path of travel under the influence of the float, characterized by an oscillatory indicating member moving in unison with the float, a supporting shaft therefor, the ends of which are counterbored, a mounting having bearings therein for said shaft, the ends of which are counterbored, a mounting having bearings therein for said shaft, the counterbored ends of the shaft being flared beyond said bearings.

15. In a fluid gauge wherein the rise and fall of a float in a tank is indicated at a distant point by the fluctuations of indicator controlled by the reciprocatory movement of an intermediate flexible member acting thru a curvilinear path of travel under the influence of the float, characterized by an oscillatory indicating member movable in unison with the float, a supporting shaft therefor, a mounting having bearings therein for said shaft, the ends of said shaft beyond the bearings being upset and enlarged by spinning, substantially as specified.

In testimony whereof, we have hereunto set our hands this 12th day of May, A. D. 1920.

JOHN G. COLLISON.
WALTER FRANK.
HARRY M. FILBERT.

Witnesses:
GEORGE HELMIG,
FRANK L. WALKER.